United States Patent
Paul et al.

(10) Patent No.: US 7,185,070 B2
(45) Date of Patent: Feb. 27, 2007

(54) GENERIC QUALITY OF SERVICE PROTOCOL AND ARCHITECTURE FOR USER APPLICATIONS IN MULTIPLE TRANSPORT PROTOCOL ENVIRONMENTS

(75) Inventors: Thanabalan Paul, Gaithersburg, MD (US); Dhadesugoor R. Vaman, Frederick, MD (US); Joonbum Byun, Rockville, MD (US)

(73) Assignee: Boyle Phosphorus LLC, Los Altos, CA (US)

( * ) Notice: Subject to any disclaimer, the term of this patent is extended or adjusted under 35 U.S.C. 154(b) by 626 days.

(21) Appl. No.: 09/841,972

(22) Filed: Apr. 25, 2001

(65) Prior Publication Data
US 2002/0091802 A1    Jul. 11, 2002

Related U.S. Application Data

(63) Continuation-in-part of application No. 09/435,549, filed on Nov. 8, 1999, now abandoned.

(51) Int. Cl.
*G06F 15/177* (2006.01)

(52) U.S. Cl. .............. 709/220; 709/203; 709/222; 709/223; 709/224; 709/228; 709/233; 370/395.21

(58) Field of Classification Search ........ 709/220–224, 709/203, 228, 233; 370/395.21
See application file for complete search history.

(56) References Cited

U.S. PATENT DOCUMENTS

| | | | |
|---|---|---|---|
| 5,548,726 A | 8/1996 | Pettus | |
| 5,742,772 A | 4/1998 | Sreenan | |
| 5,774,656 A | 6/1998 | Hattori et al. | |
| 5,944,795 A | 8/1999 | Civanlar | |
| 6,021,263 A | 2/2000 | Kujoory et al. | |
| 6,078,953 A | 6/2000 | Vaid et al. | |
| 6,081,845 A | 6/2000 | Kanemaki et al. | |
| 6,094,674 A | 7/2000 | Hattori et al. | |
| 6,105,068 A | 8/2000 | Naudus | |
| 6,128,649 A | 10/2000 | Smith et al. | |
| 6,154,778 A * | 11/2000 | Koistinen et al. ........... 709/228 |
| 6,167,445 A | 12/2000 | Gai et al. | |
| 6,189,033 B1 | 2/2001 | Jin et al. | |
| 6,195,697 B1 | 2/2001 | Bowman-Amuah | |
| 6,240,462 B1 | 5/2001 | Agraharam et al. | |
| 6,286,052 B1 | 9/2001 | McCloghrie et al. | |
| 6,366,577 B1 * | 4/2002 | Donovan ................... 370/352 |

(Continued)

*Primary Examiner*—Fritz Fleming
*Assistant Examiner*—Niketa I. Patel
(74) *Attorney, Agent, or Firm*—Davis Wright Tremaine LLP; Michael J. Donohue

(57) ABSTRACT

A generic quality of service ("G-QoS") protocol and architecture for applications executing in multiple transport protocol environments is provided. G-QoS negotiators establish a QoS level for user applications by communicating over a network and exchanging network and application data via a G-QoS protocol that can be implemented using out-of-band ICMP messages. A Dynamic Profile Management Algorithm ("DPMA") allows the G-QoS negotiators to negotiate, establish, and maintain the desired QoS level between the user applications by providing real-time monitoring of application parameters including bandwith, buffer, and cache status information of the communicating client and server. A G-QoS applications programmer interface ("API") allows network administrators to easily monitor and maintain the overall G-QoS architecture of the present invention. The G-QoS negotiators, G-QoS protocol, and DPMA form a generic QoS architecture that provides guaranteed QoS for user applications.

21 Claims, 7 Drawing Sheets

U.S. PATENT DOCUMENTS

| | | |
|---|---|---|
| 6,400,722 B1 | 6/2002 | Chuah et al. |
| 6,405,251 B1 * | 6/2002 | Bullard et al. .............. 709/224 |
| 6,516,350 B1 * | 2/2003 | Lumelsky et al. .......... 709/226 |
| 6,529,950 B1 * | 3/2003 | Lumelsky et al. .......... 709/218 |
| 6,631,122 B1 * | 10/2003 | Arunachalam et al. ..... 370/332 |
| 6,691,148 B1 * | 2/2004 | Zinky et al. ................ 709/201 |
| 6,728,365 B1 * | 4/2004 | Li et al. ..................... 379/329 |

\* cited by examiner

FIG. 2

| ICMP msg type | CODE | CHECKSUM | | |
|---|---|---|---|---|
| process_id | | | | |
| FINAL PROFILE | class=premium...etc | | VALIDITY | |
| VERSION | | | TOTAL MSG LENGTH | |

41 ICMP HEADER

| IE id=client | UNUSED | | | |
|---|---|---|---|---|
| PC TYPE | OS TYPE,VER | OS TYPE,VER | | |
| ETHERNET | DSL | OC3/12 | UNUSED | |
| MAX SPEED AVAIL. (WAN SIDE) | | | | |
| UNUSED | | | | |

42 CLIENT INFO.

| IE id=proxy | PROXY IP ADDR. | PROXY PORT NO. |
|---|---|---|
| UNUSED | | |

43 PROXY INFO.

| IE id=Appl. type | FROM WEB | UNUSED | VALIDITY |
|---|---|---|---|
| APPL. CLASS | DATA RATE | NAME | BW REQD. |
| NEW APPL. NAME | | | VALIDITY |
| RESPONSE TIME | | | VALIDITY |
| UNUSED | | | |

44 APPL. PROFILE (IF FROM WEB)

| IE id=QOS PROFILE (tr.) | UNUSED | | | | | |
|---|---|---|---|---|---|---|
| TCP | UDP | ATM | T1 | E1 | FR | VPN |
| MPLS | RSVP | DTM | DWDM | GSM | TDMA | SS7 |
| UNUSED | | | | | | |

45 TRANSPORT QOS PROFILE

| IE id=QOS SUB-PROFILE | UNUSED | VALIDITY |
|---|---|---|
| tr.sub1 | ex: BHLI, ATM addr...(if ATM).. | |
| tr.sub2 | | |

46 PER PROTOCOL QOS PROFILE

| IE id=MAP SEQ. | UNUSED | VALIDITY |
|---|---|---|
| ex3.1 | | |

47 QOS MAP ORDER FOR THE CLIENT, BY SERVER

TERMINATION BLOCK

28

GENERIC QUALITY OF SERVICE PROTOCOL AND ARCHITECTURE FOR USER APPLICATIONS IN MULTIPLE TRANSPORT PROTOCOL ENVIRONMENTS

RELATED APPLICATIONS

This application claims the benefit of and is a continuation-in-part of U.S. patent application Ser. No. 09/435,549, filed Nov. 8, 1999 by Vaman et al., the entire disclosure of which is expressly incorporated herein by reference, now abandoned.

BACKGROUND OF THE INVENTION

1. Field of the Invention

This invention relates generally to a generic quality of service ("QoS") protocol for user applications communicating via a network connected between a client machine and a server machine. More specifically, the invention provides a generic QoS protocol and architecture for ensuring user applications with a desired level of QoS, regardless of the underlying processors, operating systems, network hardware, and transport protocols utilized by the user applications.

2. Related Art

Establishing guaranteed QoS for user applications communicating over a network represents a highly-desired goal in the electronic communications art. There is presently a need to provide individuals, including applications developers, software engineers, and network users, with a simple and efficient QoS protocol that allows a given application running on a client machine to communicate with another application running on a server machine while guaranteeing a desired QoS level throughout the entire period of communication. Applications using the communications network should be able to exchange data across a channel having guaranteed bandwidth and QoS policies, regardless of the underlying processors, operating systems, and network architectures across which the data may traverse. Present QoS solutions, however, are limited to specific transport protocol types and network architectures, and lack the ability to span a variety of such protocol types and architectures.

Accordingly, what is desired, but has not heretofore been provided, is a generic quality of service protocol and architecture that provides user applications running over a network with a desired QoS level regardless of the processor architectures, operating systems, network architectures, and transport protocols used by the applications. What is also desired is a means for maintaining the desired QoS level by performing real-time monitoring and management of network and application parameters including bandwidth, buffer, and cache status, and which can be easily implemented and managed using an Application Programmer Interface ("API").

The Multimedia Communications Forum presented a QoS interoperability model for promoting the use of heterogeneous broadband access networks to support end-user applications. This model supports connection of broadband access networks via switches or combinations of enterprise and backbone networks. According to this model, QoS interoperability is achieved provided that applications running on the network can communicate with a desired QoS.

U.S. patent application Ser. No. 09/435,549 to Vaman, et al., filed Nov. 8, 1999 and currently pending, discloses a method of QoS negotiation between client and server machines for facilitating simultaneous use of and access to Asynchronous Transfer Mode ("ATM") and Internet Protocol ("IP")—based networks, wherein desired QoS levels are supported for user applications communicating thereon.

Efforts by the Internet Engineering Task Force ("IETF"), IEEE 802, and ASC T1 are currently formulating a specification for QoS for transport protocols only. These efforts, however, do not define a generic QoS protocol and maintenance procedures thereof.

None of the previous efforts, either alone or in combination, disclose or teach the benefits of the method and apparatus of the present invention, nor do they teach or suggest all of the elements thereof.

OBJECTS AND SUMMARY OF THE INVENTION

It is a primary object of this invention to provide a generic QoS protocol and architecture for applications running over networks.

It is also an object of the present invention to provide a generic QoS protocol and architecture that can be implemented across various processor architectures, network architectures, operating systems, and communications protocols.

It is a further object of the invention to provide a generic QoS protocol and architecture that supports multiple transport protocol environments.

It is still another object of the present invention to provide real-time monitoring and management of network and application parameters, including bandwidth, buffer, and cache status information.

It is yet another object of the present invention to establish and maintain a desired QoS level for applications communicating over a network using a dynamic profile management algorithm.

It is an object of the present invention to provide an Application Programmer Interface ("API") for easily implementing, monitoring, and maintaining the generic QoS protocol and architecture.

It is a further object of the present invention to provide an API that can be implemented at the application or transport level.

It is an object of the present invention to provide a generic QoS protocol and architecture that can be implemented without requiring modification to an operating system kernel.

It is yet another object of the present invention to provide a generic QoS protocol that can be implemented as an out-of-band, peer-to-peer protocol.

It is still another object of the present invention to provide a generic QoS protocol that can be implemented between an application and a socket layer.

The present invention relates to a generic quality of service ("G-QoS") protocol and architecture for user applications operating in multiple transport protocol environments. The G-QoS protocol and architecture allows applications communicating over a network to utilize a desired QoS level throughout the entire period of communication, independent of the processor architectures, operating systems, network architectures, and transport protocols utilized by the application. The protocol can be implemented between a client application and the socket layer of a communications channel, stores network and application data provided by G-QoS negotiators residing at both a client machine and a server machine, and can be implemented using out-of-band Internet Control Message Protocol ("ICMP") messages. The G-QoS negotiators analyze a variety of network and application parameters including network bandwidth, transport protocols utilized, physical network architectures, and processor types to calculate an acceptable QoS level, and communicate with each other using the G-QoS protocol. Additionally, the G-QoS protocol includes a QoS profile that can be accessed by a variety of network architectures, operating systems, processor architectures, and trasport protocols, so that each can establish the desired QoS level. A Dynamic Profile Management Algorithm ("DPMA") allows the G-QoS negotiators to negotiate, establish, and maintain the desired QoS level. A proprietary API allows the G-QoS protocol, G-QoS negotiators, and DPMA to be easily implemented and maintained by network personnel. The G-QoS protocol, API, negotiators, and DPMA form a generic QoS architecture that provides applications running in multiple transport protocol environments with a guaranteed level of QoS.

BRIEF DESCRIPTION OF THE DRAWINGS

Other important objects and features of the invention will be apparent from the following Detailed Description of the Invention, taken in connection with the accompanying drawings, in which:

FIG. 2 is a diagram showing in detail the components of the G-QoS protocol.

DETAILED DESCRIPTION OF THE INVENTION

Figure 1:
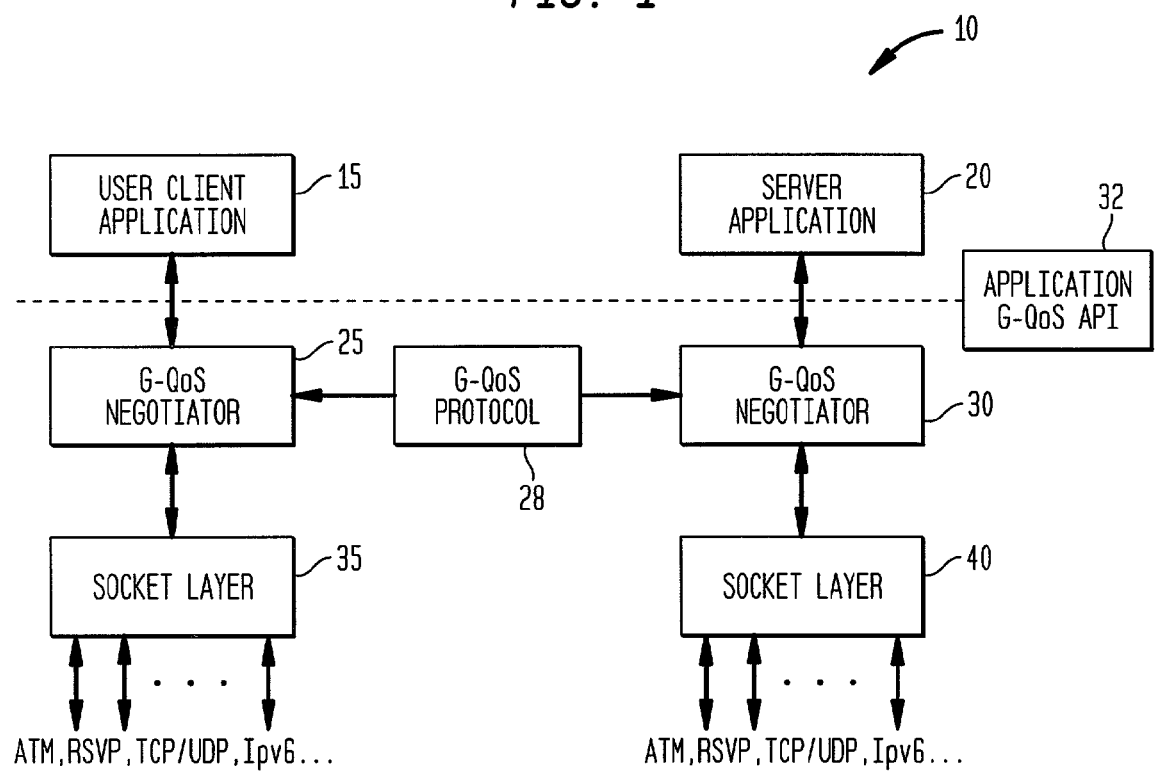
FIG. 1 is a diagram showing the G-QoS architecture of the present invention.

FIG. 1 is a diagram showing the generic quality of service ("G-QoS") architecture 10 of the present invention. G-QoS architecture 10 comprises a variety of components, each of which operate in conjunction to provide a desired level of QoS for applications running in multiple transport protocol environments. Generally speaking, a client application 15 can communicate with a server application 20 using a communications channel that has a guaranteed QoS level.

A user client application 15 desiring to communicate with a server application 20 first transfers application data to a G-QoS negotiator 25, installed on the client machine. It is to be understood that client application 15, in addition to server application 20, can be any network-ready computer applications presently known in the art. Server application 20 also transfers application data to a second G-QoS negotiator 30, residing on the same server as server application 20. Both G-QoS negotiator 25 and second G-QoS negotiator 30 analyze the respective application data and network parameters, and communicate with each other over a network. In a preferred embodiment, both G-QoS negotiators 25, 30 communicate with each other using out-of-band Internet Control Message Protocol ("ICMP") messages.

Communication between G-QoS negotiators 25, 30 is effectuated through G-QoS protocol 28. Upon communicating with each other, G-QoS negotiators 25, 30 then negotiate an acceptable level of QoS that can be utilized by both the user client application 15 and server application 20, taking into account network and application parameters at the time of negotiation. Negotiation, establishment, and maintenance of the acceptable QoS level is effectuated by a Dynamic Profile Management Algorithm ("DPMA"), illustrated in FIGS. 6a, 6b, and described in detail below. Importantly, the G-QoS protocol allows the G-QoS negotiators to communicate with each other, and further allows the DPMAs residing therein to negotiate, establish, and maintain the desired QoS level.

Once a desired QoS level has been established, G-QoS negotiators 25, 30 store application data, network data, and QoS information in G-QoS protocol 28. Application data originating from user client application 15 and server application 20 is then forwarded to socket layers 35 and 40, respectively, whereupon communication between socket layers 35, 40 can be effectuated across a network in any fashion presently known in the art. Socket layers 35, 40 include, but are not limited to, a variety of transport protocols such as Transmission Control Protocol ("TCP"), User Datagram Protocol ("UDP").

Once communication between socket layers 35, 40 has begun, an acceptable QoS level has been negotiated and stored in G-QoS protocol 28. Throughout the period of communication between socket layers 35, 40, G-QoS protocol 28 is used by G-QoS negotiators 25, 30, and the DPMAs residing therein, to maintain the desired level of QoS.

G-QoS negotiators 25, 30 and G-QoS protocol 28 can be implemented and maintained using a G-QoS API 32. G-QoS API 32 is available in both the client machine and the server machine, and allows network administrators and other personnel to easily install, configure, and maintain the G-QoS protocol. Further, G-QoS API 32 can be implemented in two embodiments.

In a first embodiment, G-QoS API 32 is implemented as an application-based API, wherein applications can be connected to the network using connection-oriented or connectionless transport services. In this arrangement, G-QoS protocol 28 G-QoS negotiators 25, 30 are controlled by the API to establish a desired level of QoS for the application and to synchronize the client and server so that the desired QoS level is maintained therebetween.

Alternatively, G-QoS API 32 can be configured in a second embodiment, whereby the API utilizes G-QoS protocol 28 to define sockets that are necessary to support a QoS level for the application. According to this implementation, G-QoS protocol 28, in conjunction with sockets, may be utilized to maintain a desired QoS level for IP-based traffic, such as IP and Virtual Private Network ("VPN") tunneling.

FIG. 2 is a diagram showing in detail the components of the G-QoS protocol 28 of the present invention. As mentioned earlier, G-QoS protocol 28 is used to exchange messages between the G-QoS negotiators 25, 30 of FIG. 1, and to store application profile, client profile, transport profile, and QoS information for usage by both the G-QoS negotiators and the DPMAs residing therein to negotiate, establish, and maintain the desired QoS level. G-QoS protocol 28 contains a variety of fields of information, and can be expanded to incorporate additional profiles, protocols, and other parameters as they are developed.

G-QoS protocol 28 comprises a series of discreet units, each representing application-specific, network-specific, and QoS-specific information. The first unit, ICMP header unit 41, contains information utilized by the G-QoS negotiators to communicate with each other via ICMP messages. The first field, "ICMP msg type," stores the type of ICMP message that the G-QoS negotiators use to communicate. The second field, "code," stores information further defining the ICMP message type stored in the first field. The third field, "checksum," stores checksum information utilized to verify data integrity during transmission. The fourth field, "process_id," identifies the process residing on both the client and the server responsible for QoS negotiation. The fifth field, "final profile," is set by a G-QoS negotiator residing at a server, and indicates whether the server G-QoS negotiator has selected a profile type, protocol, and transport medium to use for communication with the client machine. The sixth field, "class," stores the final profile class type resulting from negotiation between the G-QoS negotiators. The seventh field, "validity," stores validity information pertaining to the "final profile" and "class" fields. This field can vary according to the type of G-QoS message. The eighth field, "version," stores the current version of the G-QoS protocol. The final field, "Total msg length," stores the total length of the ICMP message. As can be easily recognized, ICMP header unit 41 is accessible by both the client and server G-QoS negotiators, and serves as a common repository for exchanging ICMP message information between the client and the server.

G-QoS protocol 28 further comprises client information unit 42. Client information unit 42 stores information about the client machine, and is utilized by the G-QoS negotiators and DPMAs to calculate a desired QoS level for the client and server applications. A client-side G-QoS negotiator analyzes the client machine, gathers information about that machine, and then stores the information in client information unit 42, where it is later accessible by a server-side G-QoS negotiator. The first field, "IE id," is an information element identifier, and for illustrative purposes, is depicted in FIG. 2 as being set to "client," thereby indicating that client information will follow. For this unit, the field is set to "client." The next field, "PC type," indicates the type of processor of the client machine. The next two fields, "OS type, ver," store information about the operating system and version of the client machine. The next field, "ethernet," stores information about the client's Ethernet connection, if the client is connected via an Ethernet network. The field "DSL" stores information about the client's Digital Subscriber Loop ("DSL") connection, if the client is connected via a DSL connection. The field "OC3/12" stores information about any underlying OC3/12 connections existing between the client and the server. Finally, the field "max speed avail" stores information about the maximum transmission speed of the underlying wide-area network. The above fields form part of client information unit 42, are set by the client-side G-QoS negotiator, and are utilized by both the client- and server-side G-QoS negotiators in calculating a QoS level.

G-QoS protocol 28 further comprises proxy information unit 43. Proxy information unit 43 stores information about any proxy servers utilized by the client or the server, if such proxy servers exist. The first field, "IE id," is an information element identifier, and for illustrative purposes, is depicted in FIG. 2 as being set to "proxy," thereby indicating that proxy information will follow. For this unit, the field is set to "proxy." The second field, "proxy IP addr," represent the IP address of the proxy server. The final field, "proxy port no," represents the TCP or UDP port number utilized by the proxy server. Either client- or server-side G-QoS negotiators can determine proxy information, store such information in proxy information unit 43, and later use the information in determining a desired QoS level.

G-QoS protocol 28 further comprises application profile unit 44. Application profile unit 44 stores information about either the client or server application. Both the client-side and the server-side G-QoS negotiators, upon analyzing either the client or server applications, generate application profile information and store same in application profile unit 44. The first field, "IE id," is an information element identifier, and for illustrative purposes, is depicted in FIG. 2 as being set to "Appl. type," thereby indicating that application type information will follow. The field "from web" contains application source information indicating whether the application was generated over the web or in a traditional client/server environment. This information is critical if the application does not require a communication with a peer end. The "validity" field specifies whether or not the application profile unit is valid, and can be used when the G-QoS message is generated. The "App. Class" field denotes the profile class required by specific applications. The "data rate" field record data transmission rates, if known at the time of transmission. The "name" field stores the generic name of the application that can be used by the server to find the correct profile requirement. The field "BW reqd." stores bandwidth requirements for the application, and can be set to a minimum or optimum value for a given application. The field "new appl. name" can be used to store information about the application if the application does not fit within the client/server model, or if it is a new application that does not match any of the defined profile categories. The "validity" field indicates the validity of the "new appl. Name" field. The "response time" field may be used to store minimum response time requirements or DPMA dynamic monitoring parameters if an application is delay-sensitive. Finally, the second "validity" field, located next to the "response time" field, identifies the validity of the "response time" field.

G-QoS protocol 28 further comprises transport QoS profile unit 45. The first field, "IE id," is an information element identifier, and for illustrative purposes, is depicted in FIG. 2 as being set to "QoS profile," thereby indicating that QoS profile information will follow. The remaining fields "TCP" through "SS7" contain information identifying the available protocols at the client, in addition to the protocol grants allowed by the server. Such protocols can include, but are not limited to, TCP, UDP, ATM, T1, E1, FR, VPN, MPLS, RSVP, DTM, DWDM, GSM, TDMA, and SS7.

G-QoS protocol 28 further comprises per-protocol QoS profile unit 46. The first field, "IE id," is an information element identifier, and for illustrative purposes, is depicted in FIG. 2 as being set to "QoS sub-profile," thereby indicating that QoS sub-profile information will follow. The "validity" field indicates the validity of QoS profile unit 46. The fields "tr.sub1" and "tr.sub2" are dependent upon information stored in Transport QoS profile unit 45, and may contain any available sub-protocol profile information. For example, the field "tr.sub1" may store the ATM address or BHLI information of any available servers.

Finally, G-QoS protocol 28 further comprises QoS map unit 47. The first field, "IE id," is an information element identifier, and for illustrative purposes, is depicted in FIG. 2 as being set to "MAP seq.," thereby indicating that QoS mapping sequence information will follow. The information stored in QoS map unit 47 indicates QoS server profile orders that are determined by the G-QoS negotiators. Using this information, the client can choose a specific server to which it can then connect. For example, if the first field of the map order contains information such as "3.1," the third protocol stored in transport QoS profile 45 and the first sub-protocol stored in per-protocol unit 46 will be utilized to set up a connection between the client and the server.

Figure 3:
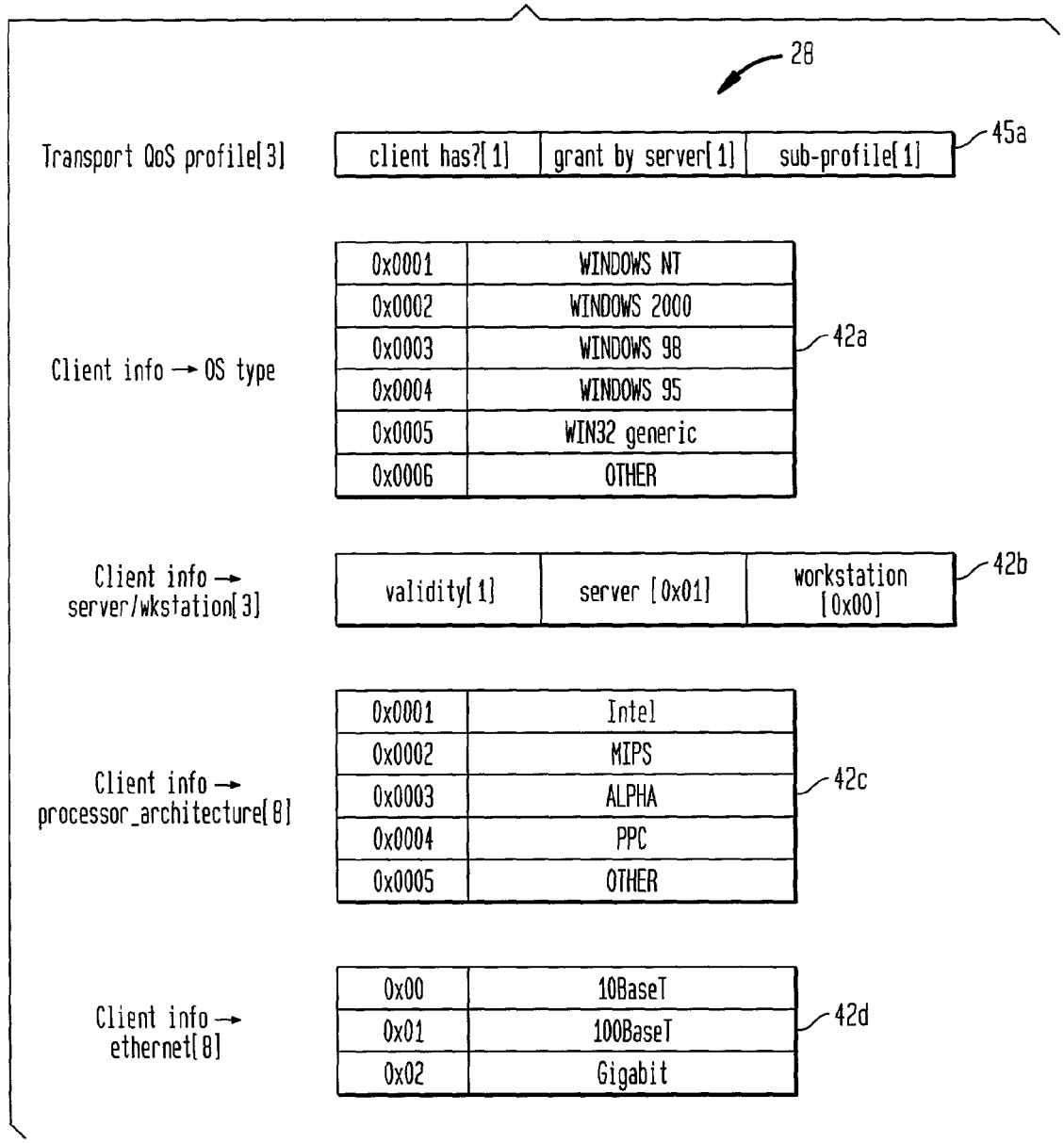
FIG. 3 is a diagram showing transport QoS profile and client information blocks of the G-QoS protocol of the present invention.

Referring to FIG. 3, depicted is a diagram showing further detail of transport QoS profile unit 45 and client information unit 42 of the G-QoS protocol 28 of the present invention. Transport QoS profile unit 45 further comprises block 45*a*, which stores at least three fields. The first field, "client has," indicates whether the client has a particular protocol available at its end. The next field, "grant by server," stores a boolean value indicating whether the particular protocol exists and whether a decision was made for the particular protocol to be used to communicate with a server listed in the map order, described above. The "sub-profile" field indicates whether the particular protocol has the sub-profile per-protocol QoS profile information settings recorded in per-protocol QoS profile unit 46 of FIG. 2, described above. Additionally, client information unit 42 of G-QoS protocol 28 is capable of storing further information pertaining to the client machine, as depicted in blocks 42*a*, 42*b*, 42*c*, and 42*d*. For example, in block 42*a*, information pertaining to the operating system of the client machine is stored. Exemplary entries include various versions of the Windows operating system by Microsoft, but can also include other operating system types, such as UNIX. Other information, such as server or workstation configurations, can be stored in block 42*b*. Further, the processor architecture of the client can be stored in 42*c*, including such architectures as MIPS by MIPS Technologies, Inc., Alpha by Compaq, PowerPC by Motorola, and other processor architectures. Additionally, information pertaining to the network interface of the client machine can be stored in block 42*d*, including physical network information such as 10-Base-T, 100-Base-T, or Gigabit Ethernet. All of the information depicted in FIG. 3 forms part of the G-QoS protocol 28, and can be utilized in achieving a desired QoS level by the architecture of the present invention.

In a preferred embodiment of the present invention, G-QoS protocol 28 is utilized to effectuate negotiation of a desired QoS level by the G-QoS negotiators, and to store application information, network information, and QoS information to establish and maintain the QoS level during the period of communication. To achieve QoS negotiation, such information must first be stored in the G-QoS protocol 28 of the present invention by a G-QoS negotiator residing at either a client or a server machine. Storage of such information may be accomplished by an algorithm, listed below in pseudocode:

TABLE 1

```
If ATM present
    { check if PVC present or SVC present }
If PVC present
    {   Set Transport_QoS_profile -> ATM.client_has = TRUE;
        Set Transport_QoS_profile -> ATM.sub_profile = TRUE;
        Set Per_Protocol_QoS_profile -> validity = TRUE;
        Set Per_Protocol_QoS_profile -> tr.sub1 = 3.1;
        Set Per_Protocol_QoS_profile -> tr.sub1.parameter = PVC
            connection values;
    }
If SVC present
    {   Set Transport_QoS_profile -> ATM.client_has = TRUE;
        Set Transport_QoS_profile -> ATM.sub_profile = TRUE;
        Set Per_Protocol_QoS_profile -> validity = TRUE;
        Set Per_Protocol_QoS_profile -> tr.sub2 = 3.2;
        Set Per_Protocol_QoS_profile -> tr.sub2 = ATM addres or
            BHLI info
    }
```

According to the pseudocode of Table 1, a G-QoS negotiator residing at a client machine first checks to determine if the client is connected to an Asynchronous Transfer Mode ("ATM") network. If so, a check is the performed to determine whether the ATM network is configured in Permanent Virtual Circuit ("PVC") mode or Switched Virtual Circuit ("SVC") mode.

If a PVC connection is preset, the G-GoSN negotiator will then utilize the above pseudocode to store pertinent network information in the G-QoS protocol. A series of transport- and protocol-specific flags in the G-QoS protocol are then set. First, the "client_has" and "sub_profile" fields of the transport QoS profile unit of the G-QoS protocol, described above, are set to boolean "true." Then, fields of the per-protocol QoS profile unit of the G-QoS protocol, also described above, are set. Specifically, the "validity" field is set to boolean "true," the "tr.sub1" field is set to "3.1," and the tr.sub1.parameter field is set to the PVC connection values calculated by the G-QoS negotiator.

Similarly, if an SVC connection is present, the G-GoSN negotiator will then utilize the above pseudocode to store pertinent network information in the G-QoS protocol. The transport- and protocol-specific flags in the G-QoS protocol are set. First, the "client_has" and "sub_profile" fields of the transport QoS profile unit of the G-QoS protocol are set to boolean "true." Then, fields of the per-protocol QoS profile unit of the G-QoS protocol are set. Specifically, the "validity" field is set to boolean "true," the "tr.sub2" field is set to "3.2," and the tr.sub2.parameter field is set to either the ATM address or BHLI information calculated by the G-QoS negotiator.

It is to be understood that the above pseudocode can be modified to apply to other network architectures, such as Ethernet. The information stored using the algorithm of Table 1 will be utilized by the G-QoS negotiator to negotiate a desired QoS level with another G-QoS negotiator, and to maintain the desired QoS level once it has been established.

Figure 4:
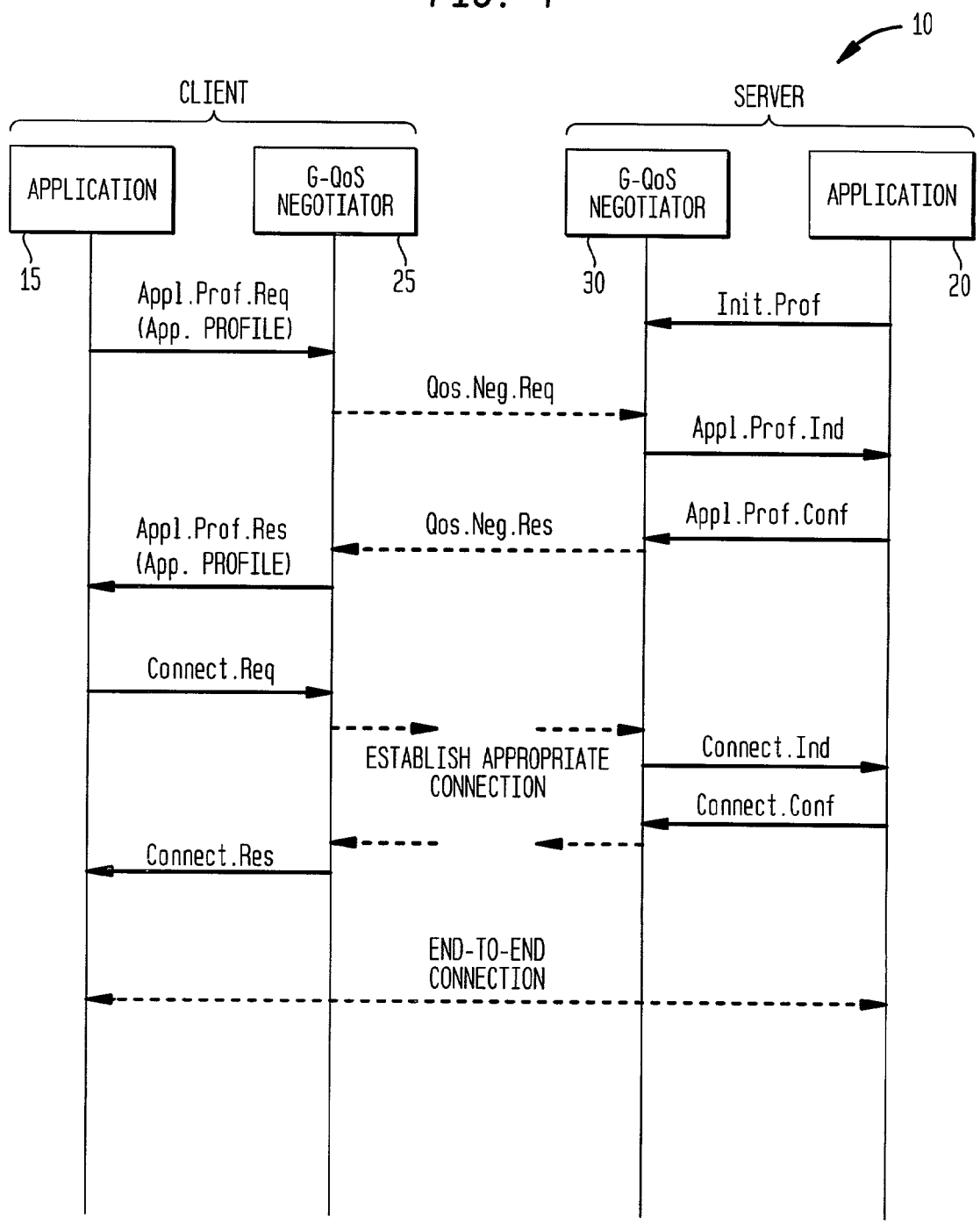
FIG. 4 is a diagram showing QoS negotiation procedures between a client and a server using the G-QoS protocol of the present invention.

Turning now to FIG. 4, depicted is a diagram showing the QoS negotiation procedures between G-QoS negotiators residing at client and server machines. Negotiation allows the G-QoS negotiators to properly map a given client machine to a server machine, to acquire knowledge of the client platform, access network, operating system, local gateway, network access support information, application type, and multi-service requirements. Using this information, the G-QoS negotiators calculate an acceptable QoS level for both the client and the server, and identify information rates, response times, security levels, and acceptable error levels for the data to be transmitted from the client to the server. Further, the QoS negotiation procedures allow the achitecture of the present invention to adjust to connection-oriented versus connection-less services, variations in bandwidth, delays in transmission, and variance/channel errors. Thus, using QoS negotiation, the entire architecture of the present invention can dynamically adjust to a variety of changing data and network parameters.

In a preferred embodiment of the present invention, the QoS negotiation procedures comprise the exchange of G-QoS messages between the client and server G-QoS negotiators. These messages allow each of the G-QoS negotiators to arrive at a desired QoS level prior to establishing a connection between the client and the server. Such messages include, but are not limited to, the following types: profile request messages, profile response messages, profile indication messages, profile conformation messages, connection request messages, connection response messages, connection indication messages, and connection confirmation messages. The transmission of such messages can be regulated by adjusting various parameters of the G-QoS protocol, either in response to network conditions or a network administrator's initiative.

For illustrative purposes, a sample profile request message is shown below:

TABLE 2

```
G-QoS->ApplType.i_appl_InformationElement = IE_QOS_APPL_PROFILE;
G-QoS->ClientInfo.i_cl_InformationElement = IE_CLIENT;
G-QoS->MapSequence.i_map_InformationElement = IE_MAP_ORDER;
G-QoS->ProxyInfo.i_pxy_InformationElement = IE_PROXY;
G-QoS->SubHeader.i_InformationElement = IE_SUBHEADER;
G-QoS->TransportProfile.i_tr_InformationElement = IE_QOS_TRANSPORT_PROFILE;
G-QoS->TransportSubProfile.i_trsub_InformationElement = IE_QOS_SUBPROFILE;
G-QoS->ApplType.i_appl_validity = ENABLE;
G-QoS->ClientInfo.i_cl_validity = ENABLE;
G-QoS->MapSequence.i_map_validity = DISABLE;
G-QoS->SubHeader.final_profile.i_validity = DISABLE;
G-QoS->TransportProfile.i_tr_validity = ENABLE;
```

The message depicted in Table 2 represents a sample profile request sequence achieved by the present invention. The message sequence is utilized to set a variety of the parameter of the G-QoS protocol, described in detail above and illustrated in FIGS. 2,3. The messages created by the G-QoS negotiators set specific G-QoS protocol parameters, which in turn are used by the client and server machines to effectuate a connection therebetween. For example, the first line of Table 2 illustrates an application type message which sets the "IE id" field of the application profile unit 44 of FIG. 2 to "IE_QoS_APPL_PROFILE." This designation can then be utilized by the client or the server to extract application profile information from the G-QoS protocol and thereafter establish a connection with a selected server. It is to be understood that additional profile request messages and settings not illustrated in Table 2 can be included in the invention.

Depicted in FIG. 4 is the exchange of messages, similar to the message illustrated in Table 2, achieved by the architecture 10 of the present invention. Four distinct, communicating elements are depicted; namely, client application 15, client G-QoS negotiator 25, server application 10, and server G-QoS negotiator 30. It is to be noted that, ultimately, the client application and the server applications 15, 20 communicate with each other using a channel having a desired QoS level. Prior to such communication, however, an exchange of messages must occur.

First, client application 15 sends a profile request message to client G-QoS negotiator 25. Then, upon receiving the message, G-QoS negotiator 25 sends a QoS negotiation request message to server G-QoS negotiator 30. The QoS negotiation request message contains information about the client, such information being derived from the client information stored in the G-QoS protocol fields, described above. Upon receiving the QoS negotiation request message, server G-QoS negotiator 30 receives an application initiation profile request from server application 20, which it utilizes in forming an appropriate response to the QoS negotiation request. Server G-QoS negotiator 30 then formulates a QoS negotiation response message, which contains a server map order determined by the server G-QoS negotiator 30, and ranked according to the QoS profiles of available servers. Further, the QoS negotiation response message contains QoS profile information that will be utilized in establishing an end-to-end connection between the client and server applications. Once the QoS negotiation response message has been formulated, server G-QoS negotiatior 30 communicates with server application 20 by exchanging application profile indication and confirmation messages. These messages can then be utilized by server G-QoS negotiatior 30 to formulate the QoS negotiation response message.

The QoS negotiation response message is then sent back to client G-QoS negotiator 25 by server G-QoS negotiator 30. It is important to note that the QoS negotiation response message contains transport profile setting information calculated by the server G-QoS negotiator. This information will then be utilized by client G-QoS negotiatior 25 to communicate to establish an end-to-end connection between client application 15 and server application 20. Thus, when client G-QoS negotiator 25 receives the QoS negotiation response message, it forwards information to client application 15 in the form of an application profile response message. Client application 15 then utilizes this information to initiate a connection request, based upon the QoS profile and transport information stored in the application profile response message. The connection request is received by the client G-QoS negotiator 25, thereby prompting client G-QoS negotiator 25 to operate in conjunction with server G-QoS negotiator 30 to establish an end-to-end connection between client application 15 and server application 20.

Prior to establishing the end-to-end connection, and upon receiving the connection request from client G-QoS negotiator 25, server G-QoS negotiator 30 transmits and receives connection indication and confirmation messages with server application 20. Then, using the QoS profile and transport information already negotiated by client and server G-QoS negotiators 25, 30, both the client application 15 and the server application 20 may begin communicating with each other. The communication between client application 15 and server application 20 represents an end-to-end connection that has a desired QoS level achieved by the QoS negotiation procedures.

Figure 5:
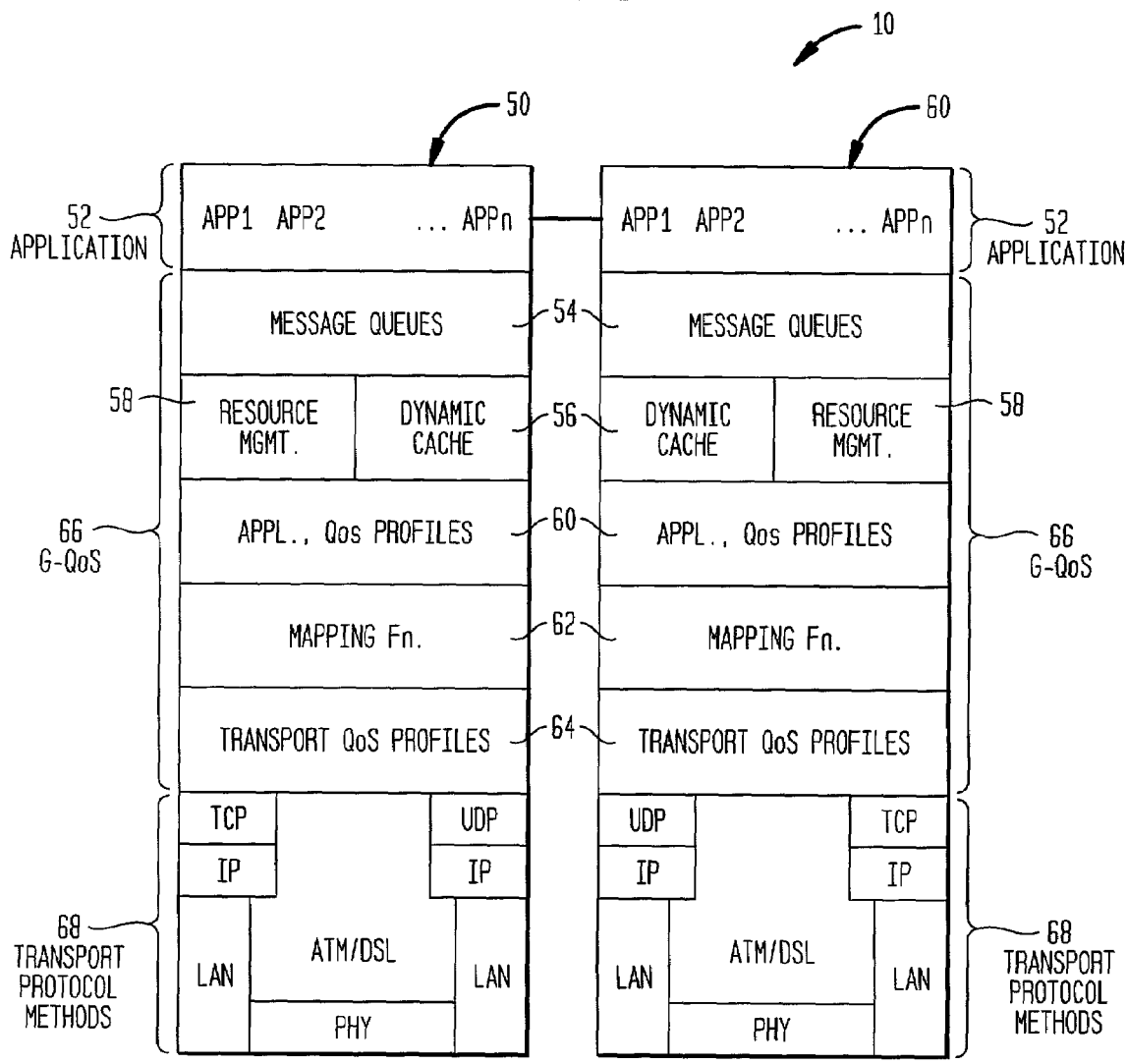
FIG. 5 is a peer-to-peer entity diagram showing the G-QoS protocol of the present invention.

FIG. 5 is a peer-to-peer entity diagram showing the G-QoS protocol of the present invention 10. Shown are the peer-to-peer relationships for both a client G-QoS negotiator 50 and a server G-QoS negotiator 60, both of which are responsible for the G-QoS negotiation process. Further shown are three relationships existing at application layer 52, G-QoS protocol layer 66, and transport protocol layer 68. Depicted are only a few transport protocol methods at transport protocol layer 68, it being understood that additional protocols may be included. The G-QoS protocol of the present invention 10 is positioned at G-QoS protocol layer 66, below application layer 52, and is responsible for negotiating the correct QoS profile needed for a particular application. G-QoS protocol layer 66 comprises message queue layer 54, dynamic cache layer 56, resource management layer 58, application QoS profile layer 60, mapping function layer 62, and transport QoS profile layer 64. G-QoS protocol layer 66 maps the application profile to the transport profile using a mapping function in mapping function layer 62. The mapping function is accomplished by automatically extracting the client information from the client machine and formulating appropriate messages for the G-QoS message exchanges. The mapping function locates the correct profile, sets up the resources needed for the application, and dynamically manages the resources, cache, queues of the client or server. In a preferred embodiment, the mapping function of the G-QoS protocol is accomplished by the DPMA algorithm of the present invention, discussed below.

Figure 6A:
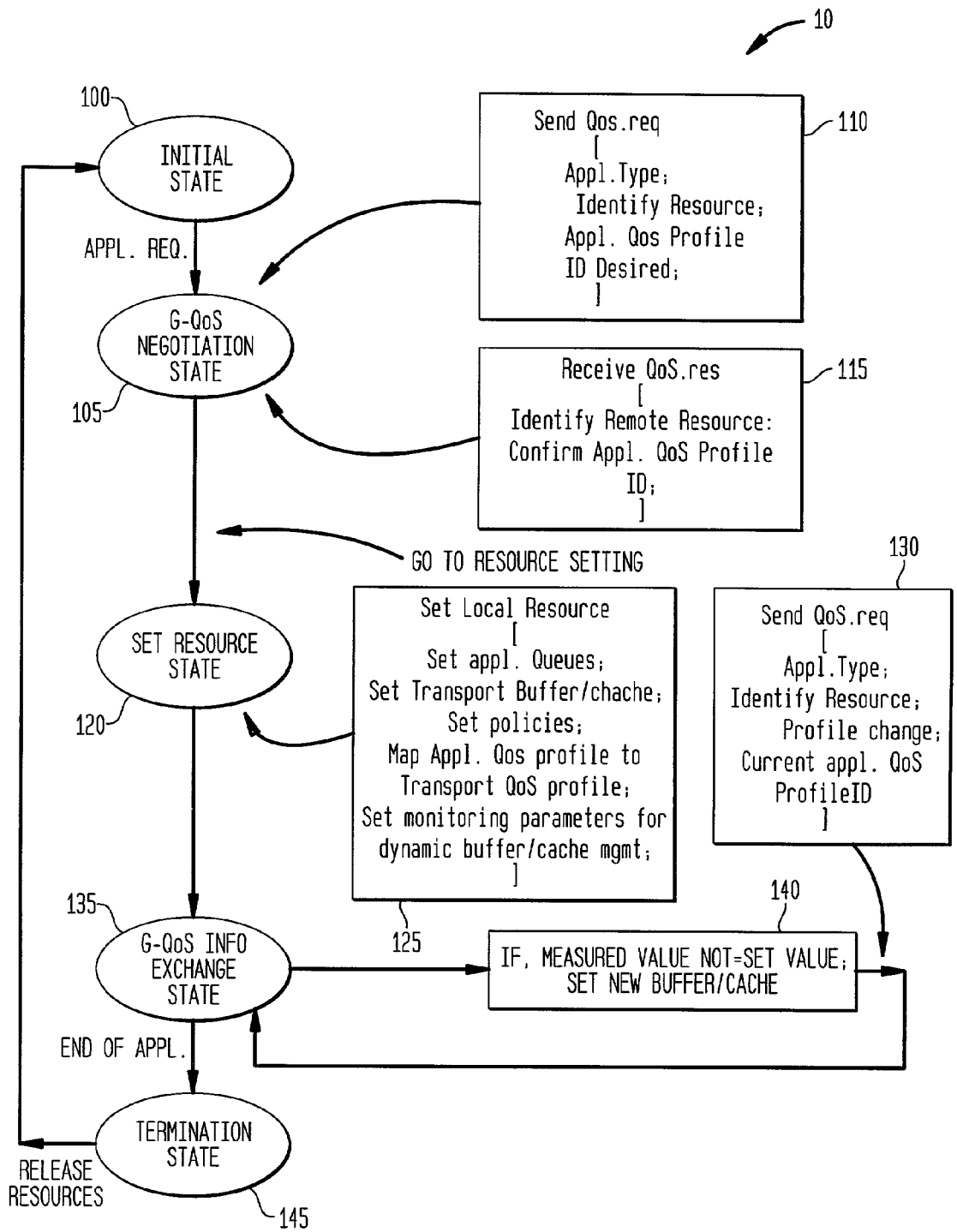
FIG. 6a is a state diagram showing the DPMA algorithm of the present invention implemented in a client machine.

FIG. 6a is a state diagram showing the DPMA algorithm of the present invention implemented in a G-QoS negotiator at a client machine. As mentioned earlier, the client and server G-QoS negotiators are responsible for negotiating, establishing, and maintaining a desired QoS level for client and server applications by communicating with each other using the G-QoS protocol of the present invention. The negotiation procedures, described above, are enabled by the DPMA of the present invention. The DPMA may be embodied in two forms, each specifically tailored for client and server G-QoS negotiators. Importantly, the DPMA provides the logic necessary for the G-QoS negotiators to negotiate, establish, and maintain the QoS level.

Depicted in FIG. 6a is the DPMA of the G-QoS architecture 10 of the present invention, as implemented in a client G-QoS negotiator. This state diagram shows a variety of states of operation, each of which are executed by the client to effectuate QoS negotiation with a server G-QoS negotiator. Beginning in initial state 100, an application request message is received by the client G-QoS negotiator from a client application. Initial state 100 gathers the application name and other parameters, and forwards same to state 105. In state 105, QoS negotiation is effectuated between the client and the server. State 105 retrieves the application information gathered by state 100, including, but not limited to, application name, application type, bandwidth requirements, and data rate requirements, and converts same into a QoS request message. Additionally, state 105 stores client information, application QoS profile requirements, and client-side protocol availability information in the G-QoS protocol. State 105 then sends the QoS request message to the server G-QoS negotiator, and waits for a response. Importantly, while state 105 waits for the response, it may also construct and send additional QoS profile requests to the server G-QoS negotiator in the manner described.

Depicted in blocks 110, 115 are sample procedures for sending QoS request messages and receiving QoS response messages achieved by state 105. In one embodiment, a QoS request message can be configured in the manner depicted in block 110 to contain application type data, resource identification data, and desired application QoS profile information. Further, when a QoS response message is received by state 105, in can be processed in the manner depicted in block 115, wherein remote resources are identified and application QoS profile identifiers are confirmed. Importantly, both of the exemplary procedures depicted by blocks 110, 115 can be performed by state 105.

When a QoS response message is received from the server G-QoS negotiator in state 105, it is then processed, and QoS profile map order information is retrieved therefrom. Additionally, remote resources are identified, and state 105 then invokes state 120. State 120 represents a resource setting state, wherein local resources are configured according to the QoS profile information negotiated in state 105. Specifically, in response to such information, state 120 sets up application queues, configures transport buffer and cache policies, and dimensions parameters that are utilized to maintain the agreed-upon QoS level. Importantly, the client application profile is mapped by state 120 to a transport profile negotiated in step 105.

Depicted in block 125 are procedures accomplished by state 120 to set local resources in response to the negotiated QoS profile and transport parameters. Specifically, application queues are set, transport buffer and cache parameters are configured, policies are set, application QoS profiles are mapped to transport QoS profiles, and monitoring parameters are dimensioned. Once these procedures have been completed, state 120 then invokes state 135.

In state 135, dynamic profile management of the QoS parameters is accomplished. In this state, client parameters are monitored, including buffer and cache management status. Specifically, the buffer and caches are monitored and compared to a pre-determined threshold, $X_{min}$. If the measured values of the buffer and the cache are the same as the pre-determined threshold, no information is sent to the server G-QoS negotiator. However, if the measured values fall below the pre-determined threshold, as indicated in state 140, the buffers and caches are set to a higher value, specifically $X_{min}$+Delta. The higher value is monitored by state 140 so that it does not exceed a second predetermined threshold. Additionally, state 140 sends a QoS request message to the server G-QoS negotiator. Procedures for doing so are depicted in block 130, wherein the application type, resource identification, profile change, and current application QoS profile identification information are gathered and sent to the server G-QoS negotiator. In response to this message, the server G-QoS negotiator adjusts its buffer and cache values, such that the adjusted values do not exceed the second predetermined threshold.

States 135 and 140 continue to loop until the client application has terminated, thereby dynamically adjusting local and remote buffer and cache parameters as the application executes. This thereby allows the QoS for the application to be adjusted dynamically, in response to changing network and application conditions. When the application is finished, state 145 is invoked, wherein resources utilized by all of the states and procedures of FIG. 6a are released for future use. Further, state 145 then re-invokes state 100, so that the DPMA can then be applied to another client application.

Figure 6B:
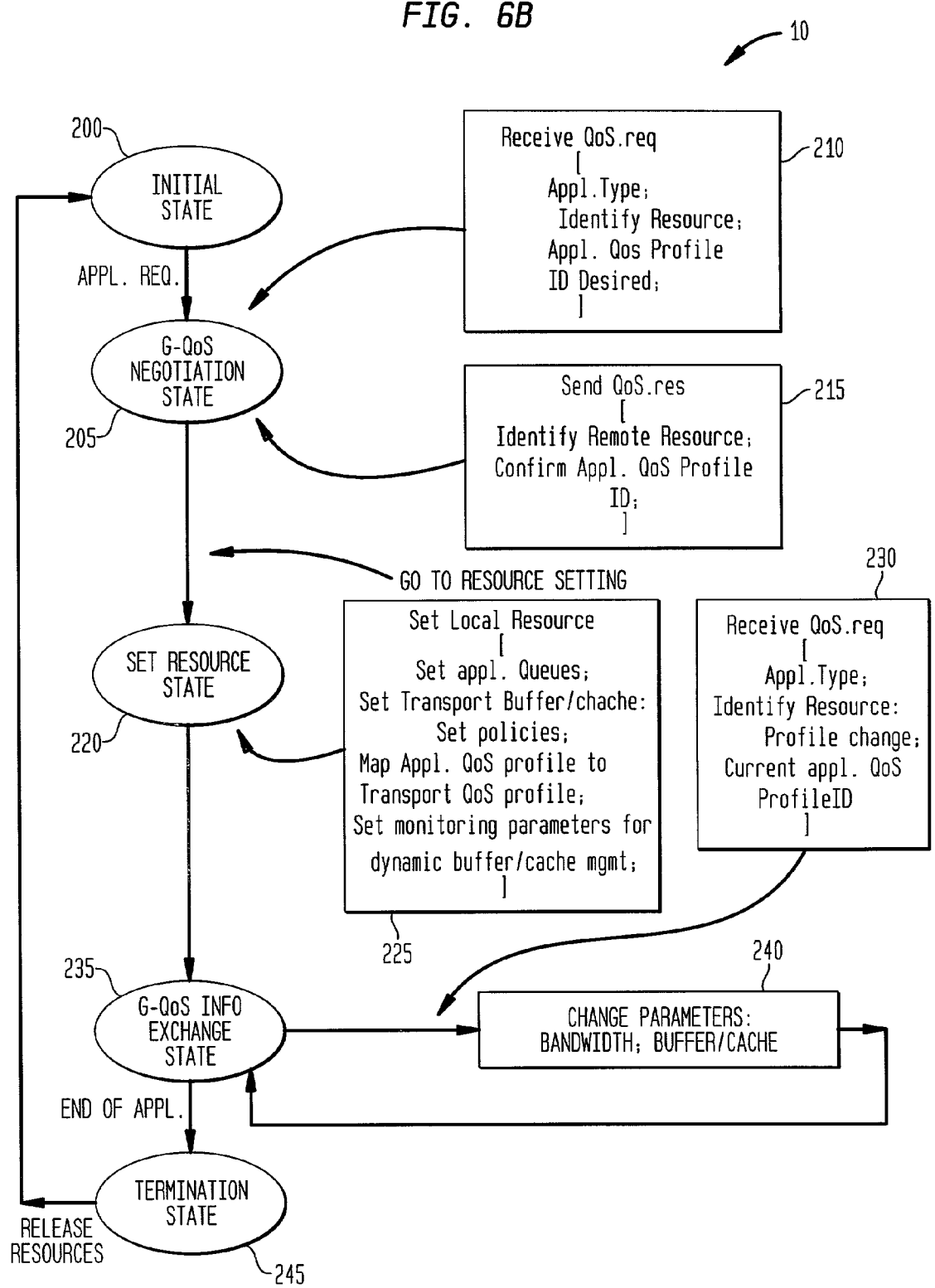
FIG. 6b is a state diagram showing the DPMA algorithm of the present invention implemented in a server machine.

FIG. 6b is a state diagram showing the DPMA algorithm of the present invention implemented in a G-QoS negotiator at a server machine. The DPMA algorithm executed on a server is similar in concept to the DPMA algorithm executed on the client, with certain differences. Specifically, a variety of states 200, 205, 220, 235, 240, and 245 are executed in the server G-QoS negotiator, but according to different procedures.

Starting with state 200, the server G-QoS negotiator awaits for a QoS request message from the server G-QoS negotiator. When a QoS request message is received, state 200 invokes state 205. In state 205, the QoS request message is analyzed according to the procedure described in block 210, wherein client application type, resource identification, and application QoS profile identification information is extracted. Further, the application name and additional parameters are extracted and analyzed. Based upon this information, and the available QoS and transport profiles, state 205 constructs a QoS map order, which represents the various QoS profile sequences available for the client application to use. This information, along with local resource identification information, is stored in a QoS response message by state 205, and sent to the client G-QoS negotiator. In one embodiment, the QoS response may be set by state 205 according to the procedure depicted in block 215, wherein local resources are identified, and application QoS profile identifications are confirmed, both of which are sent in the QoS response message to the client machine.

Once the QoS response message is constructed and sent in state 205, state 220 is invoked, wherein local resources are set according to the QoS response message. Specifically, server G-QoS negotiator can adjust a variety of server parameters according to the procedures depicted in block 225. For example, application queues are set, transport buffer and cache parameters set, local policies set, application QoS profiles mapped to transport QoS profiles, and monitoring parameters are set for dynamic buffer and cache management. Once resources are set, state 220 then invokes state 235.

In state 235, dynamic profile management of the QoS parameters is accomplished. In this state, client parameters are monitored, including buffer and cache management status. Such parameters are adjusted in response to a QoS request message sent by the client. If a QoS request message is received in state 235, the server G-QoS negotiator can dynamically adjust local buffer and cache values in response. First, local buffer and cache values are measured and compared to a predetermined threshold, $X_{min}$. If the values do not exceed the predetermined threshold, or if no QoS request message is received at the server, no action is taken. If a QoS request message is received, it is processed by state 235 according to the procedure depicted in block 230, wherein application type, resource identification, profile change, and application QoS identification information is obtained. Further, if the measured values of the buffer and cache fall below the predetermined threshold, or if a QoS request message is received, the server buffer and cache values can be adjusted in state 240 to a value $X_{min}$+Delta, such that the newly adjusted value does not exceed a second predetermined threshold.

When state 240 has finished adjusting local buffer and cache values, state 235 is re-invoked. States 235 and 240 loop throughout the duration of the application, so that the QoS parameters of the server can be dynamically adjusted according to changing application and network conditions. When the application is terminated, state 245 is invoked. Further profile requests and server resource configurations can occur according to the following equation:

$$[Y_{max} - (X_{1,max} + X_{2,max} + \ldots + X_{(n-1),max})] >= X_{n,max} \quad (1)$$

where $X_{n,max} = X_{n,min} + \Delta_m$, $\Delta_m = \Delta 1 + \Delta 2 + \ldots \Delta N$, X=application, buffer, cache, bandwith, and profile requirements, and Y=server G-QoS negotiator buffer, channel, cache, bandwidth, and profile availability.

Having thus described the invention in detail, it is to be understood that the foregoing description is not intended to limit the spirit and scope thereof. What is desired to be protected by Letters Patent is set forth in the appended claims.

What is claimed is:

1. A method for providing quality of service for applications in multiple transport protocol environments which comprises:

creating a QoS negotiation request for a client application at a client QoS negotiator;

transmitting the QoS negotiation request from the client QoS negotiator to a server QoS negotiator;

adjusting server QoS parameters in response to the QoS negotiation request;

creating a QoS negotiation response at the server QoS negotiator, the QoS negotiation response containing connection information and server QoS information;

transmitting the QoS negotiation response to the client QoS negotiator;

adjusting client QoS parameters in response to the QoS negotiation response; and connecting the client application to a server application using the connection information and the server QoS information.

2. The method of claim 1 further comprising:

monitoring the client QoS parameters and the server QoS parameters as the client application and the server application communicate;

detecting changes in network conditions and data requirements of the client application and the server application; and adjusting the client QoS parameters and the server QoS parameters in response to said changes.

3. The method of claim 2 wherein the step of adjusting server QoS parameters further comprises adjusting server bandwidth, server buffer, and server cache parameters.

4. The method of claim 3 wherein the step of adjusting client QoS parameters further comprises adjusting client bandwidth, client buffer, and client cache parameters.

5. A method for providing dynamic profile management for a client which comprises:

receiving an application profile request from a client application;

constructing a QoS request for the client application based at least in part on the application profile;

transmitting the QoS request to a server;

receiving a QoS response from the server;

adjusting client settings based upon the QoS response; and connecting the client application to a server application residing at the server using connection information and server QoS information stored in the QoS response.

6. The method of claim 5 further comprising:

monitoring the client application for changes in data requirements;

detecting changes in network conditions at the client;

sending a second QoS request to the server in response to the changes in data requirements or the changes in network conditions;

receiving a second QoS response from the server; and adjusting the client parameters in response to the second QoS response.

7. The method of claim 6 further comprising repeating the steps of claim 6 until execution of the client application terminates.

8. The method of claim 7 wherein the step of constructing the QoS request further comprises:

identifying application type information and application QoS requirements; and storing the application type information and application Qos requirements in the QoS request.

9. The method of claim 8 wherein the step of adjusting client settings further comprises setting bandwidth, buffer, and queue parameters of the client.

10. A method for providing dynamic profile management for a server which comprises:
   receiving a QoS request originating from a client at the server;
   constructing a QoS response containing connection information and server QoS information;
   adjusting server parameters in response to the QoS request;
   transmitting the QoS response to the client; and
   connecting a server application residing at the server to a client application based upon the connection information and server QoS information.

11. The method of claim 10 further comprising:
   receiving a second QoS request send by the client in response to changes in data requirements or network conditions;
   adjusting server parameters in response to the second QoS request;
   creating a second QoS response; and
   transmitting the second QoS response to the client.

12. The method of claim 11 wherein the step of adjusting server parameters further comprises setting bandwidth, buffer, and queue parameters of the server.

13. A generic quality of service architecture implemented with a client computer and a server computer, comprising:
   a client QoS negotiator in communication with a client application, the client QoS negotiation configured to create a QoS negotiation request and to adjust client QoS parameters in response to a QoS negotiation response message from the server computer;
   a server QoS negotiator in communication with a server application, the server QoS negotiator configured to receive a QoS negotiation request from the client QoS negotiation and to alter server QoS parameters in response thereto, the server further configured to generate the QoS negotiation response message;
   a generic QoS protocol accessible by the client QoS negotiator and the server QoS negotiator; and
   a generic QoS API for configuring, monitoring, and maintaining the client QoS negotiator, the server QoS negotiator, and the generic QoS protocol.

14. The architecture of claim 13, wherein said client QoS negotiator is disposed above and communicates with a client socket layer.

15. The architecture of claim 14, wherein said client socket layer further comprises ATM, RSVP, TCP/UDP, and IPv6 protocols.

16. The architecture of claim 15, wherein said server QoS negotiator is disposed above and communicates with a server socket layer.

17. The architecture of claim 16, wherein said server socket layer further comprises ATM, RSVP, TCP/UDP, and IPv6 protocols.

18. The architecture of claim 17 wherein the client QoS negotiator negotiates a QoS profile with the server QoS negotiator by exchanging messages and sharing information through the generic QoS protocol.

19. The architecture of claim 18 wherein the client QoS negotiator sets local bandwidth, buffer, and cache parameters for the client application.

20. The architecture of claim 19 wherein the server QoS negotiator sets local bandwidth, buffer, and cache parameters for the server application.

21. The architecture of claim 20 wherein the client QoS negotiator and the server QoS negotiator connect the client application to the server application based upon the QoS profile.

* * * * *